United States Patent [19]

Paulen

[11] 4,127,461

[45] Nov. 28, 1978

[54] PHOTO PROCESS FOR PREPARING MIXTURES WITH BUILDING TACK WHICH ARE BASED ON RUBBER-LIKE COPOLYMERS OF ETHYLENE

[75] Inventor: Hendrikus J. G. Paulen, Roosteren, Netherlands

[73] Assignee: Stamicarbon, B.V., Geleen, Netherlands

[21] Appl. No.: 567,841

[22] Filed: Apr. 14, 1975

Related U.S. Application Data

[63] Continuation-in-part of Ser. No. 517,052, Oct. 22, 1974, abandoned.

[30] Foreign Application Priority Data

Oct. 26, 1973 [NL] Netherlands .......................... 7314796
Oct. 11, 1974 [NL] Netherlands .......................... 7413445

[51] Int. Cl.$^2$ ............................ C08F 8/00; C08F 2/40
[52] U.S. Cl. .......................... 204/159.14; 204/159.18; 204/159.2; 260/33.6 AQ; 260/848; 260/889; 260/897 R; 260/897 A; 260/897 B
[58] Field of Search .............. 260/878, 848, 897, 88.9; 204/159.14, 159.20, 159.18

[56] References Cited

U.S. PATENT DOCUMENTS

| | | | |
|---|---|---|---|
| 3,616,362 | 10/1971 | Soldatos | 204/159.14 |
| 3,840,448 | 10/1974 | Osborn et al. | 204/159.14 |
| 3,846,266 | 11/1974 | Duynstee et al. | 204/159.2 |
| 3,860,505 | 1/1975 | Tarney et al. | 204/159.2 X |
| 3,990,958 | 11/1976 | Sasse | 204/159.22 |

OTHER PUBLICATIONS

Rubber Age, "News Reports", pp. 61–65, Oct. 1, 1974.

*Primary Examiner*—Richard B. Turer
*Attorney, Agent, or Firm*—Cushman, Darby & Cushman

[57] ABSTRACT

A process for preparing a mixture based on a rubberlike copolymer of ethylene, at least one other alpha - alkene and one or more polyenes and tackifying resins which has good building tack.

This good building tack can be obtained if the copolymer contains C=C bonds positioned in the non linear part of the polymer chains, the carbon atoms of which C=C bonds either have two hydrocarbon groups which are in vicinal cis relative positions and which do not form part of the same cyclic system, or have at least three hydrocarbon groups. In order to obtain the desired high building tack value the mixture must show in unvulcanized state an elongation at break of at least 500% and a tensile strength lying between 1.5 and 50 kg/cm$^2$. The mixture must be subjected to an artificial light source radiating light with a wave length of between 200 and 300 nm and impacting a radiated energy to the mixture of at least 2 microwatts/cm$^2$ per nm in the presence of oxygen and a photosensitizer.

33 Claims, No Drawings

PHOTO PROCESS FOR PREPARING MIXTURES WITH BUILDING TACK WHICH ARE BASED ON RUBBER-LIKE COPOLYMERS OF ETHYLENE

This application is a continuation-in-part of Ser. No. 517,052, filed Oct. 22, 1974, now abandoned.

The invention relates to a process for preparing mixtures with building tack which are based on a rubber-like copolymer of ethylene, at least one other alpha-alkene, and one or more polyenes and tackifying resins.

Amongst the synthetic rubber-like polymers known those composed of ethylene, at least one other alpha-alkene, and one or more polyenes take an important place because of their excellent resistance to ozone, weather influences, and ageing. These favourable properties make it attractive to apply copolymers of this kind for a variety of purposes.

However, copolymers composed of ethylene, at least one other alpha-alkene, and one or more polyenes, as is the case with many synthetic elastomers, like styrenebutadiene copolymers, have little or no tack or building tack.

Building tack or tack is here understood to mean the bonding strength which surfaces of the same non-vulcanized rubber show towards each other if contacted at a moderate pressure.

A sufficiently large tack, however, is necessary for the manufacture of many objects and in particular for the manufacture of objects built up of several parts or layers, like driving belts, conveyor belts, and more particularly motor-tires. For, by means of an adequate tack a permanently good bond between the various parts or layers of which the article is made is obtained during the assembly and the vulcanization.

In the case of the rubber-like copolymers of ethylene, at least one other alpha-alkene, and one or more polyenes, a solution for the tack deficiency has been sought in methods according to which objects are manufactured by separately cementing each of the rubber surfaces together to a sandwich-like structure with the aid of an adhesive which is applied in layers. Such a process is not only cumbersome and, hence, not attractive for industrial application, but in the composition and application of adhesives of this kind flammable organic solvents are applied as a rule, so that such a method, if for no other reason but operational safety, is not advisable.

Another possibility for the elimination of the tack deficiency of these copolymers which are composed of ethylene, at least one other alpha-alkene, and one or more polyenes is admixture of elastomers having sufficient tack as such. It has notably been investigated whether admixture of natural rubber would offer a solution. It has appeared, however, that such large quantities of natural rubber have to be admixed to obtain a mixture having an acceptable tack level that the resistance against ozone and ageing is strongly reduced. In this way, the advantage involved in using copolymers of ethylene, at least one other alpha-alkene, and one or more polyenes are lost to a considerable degree. Moreover it has appeared that the physical and mechanical properties of these mixtures after vulcanization are appreciably less than those of the polymers separately.

Also numerous tackifying resins, so-called tackifiers, have been developed, like condensation products of phenols and aldehydes and condensation products of acetylene, alkylated phenol resins, such as those known by the trade mark of Amberol ST 140 F, phenolated isoprene resins and phenolated isoprene copolymer resins. These resins offer the advantage that they can be mixed through the whole rubber mass and need not be applied to the rubber faces in layers. In practice, however, it has appeared necessary, in order to achieve a tack level which is reasonable in some degree, to add tackifiers in such large quantities that this results in a deterioration of the properties of the vulcanized product. Moreover, these tackifiers migrate strongly to the rubber surface owing to the application of these large quantities, so-called sweating. In the rolled and calandered rubber-like ethylene copolymers there is a risk, because of the application of these large quantities, that during storage the excessive sweating will fully undo the useful effect initially achieved and even change it into a disadvantageous effect. Further, the use of such large quantities of tackifier is extremely expensive. If the tackifier is applied in minor amounts, these disadvantageous phenomena are largely avoided; unfortunately, however, a satisfactory bonding strength has never been achieved in practice with application of such amounts.

These experiences, supported by numerous experiments with a great variety of tackifiers and rubber-like ethylene copolymers, therefore, have led those skilled in the art to believe that the tack of rubber-like ethylene copolymers cannot be so increased by admixture of tackifiers that compositions based on ethylene copolymers and tackifiers are obtained which have a satisfactory bonding strength.

From the Netherlands patent application Nos. 7113143 and 7113144 it is known that mixtures consisting of rubber-like copolymers of ethylene, at least one other α-alkene, and one or more polyenes, together with one or more tackifiers, have an unprecedentedly good bonding strength if the thermogram recorded by means of differential scanning calorimetry, in which thermogram the heat of crystallization is plotted as a function of the temperature, shows a peak (d.s.c. peak) whose maximum lies at a temperature of between $-7°$ and $11°$ C. In this process the mixture of rubber-like ethylene copolymer, tackifier, and, possibly, the usual additives is stored for many hours, whereupon the desired bonding strength is obtained. Such a process however is not attractive in practice because of the long storage time. If the mixture is stored for a shorter time the bonding strength obtained will usually be lower. Additionally, the bonding strength value is subject to undesirable variations.

The purpose of the invention is to provide a process which, in a rapid and surer way, yields compositions with such a large and constant bonding strength that they can be applied with optimum results for the manufacture of various objects, particularly such built up from several layers articles as driving belts, conveyor belts, and, principally, motor-tires.

It has now been found that in case the ethylene copolymer contains $C=C$ bonds in the non-linear part of the polymer chains, the carbon atoms of which bonds either having two hydrocarbon groups which are in vicinal cis relative positions and which do not form part of the same cyclic system or having at least three hydrocarbon groups, a very high and constant bonding strength can be obtained within a very short period of time provided the mixture of ethylene copolymer, tackifying resin, and, possibly, the usual additives is exposed to light having a wave length of between 200 and 800 nanometers in the presence of oxygen and a photosensitizer and the mixture, in non-vulcanized state, has an elongation at break of at least 500% and a tensile strength lying between 1.5 and 50 kg/cm².

It was extremely surprising that with the aid of light, more particularly with light imparting a great radiated energy to the mixture, together with a photosensitizer in the presence of oxygen, constant and high bonding strength values could be reached in a very short period of time which, previously, were not possible or only possible after a long storage period provided the mixture has highly specific mechanical properties. By preference, light is applied which imparts to the mixture a radiated energy of at least 2 $\mu W/cm^2$ per nanometer.

Although already in the Netherlands Patent Applications mentioned above ethylene copolymers were applied which, in the non-linear part of the polymer chains, contained C=C bonds whose carbon atoms had three hydrocarbon groups, and the mixtures of these copolymers, together with tackifying resin and the usual additives, such as carbon black and oil, have, of course, been subjected to normal room light, this light has never had a larger intensity than that of the normal fluorescence lamps used for illumination of room, notably 0.8 $\mu W/cm^2$ per nanometer. In the present process, preferably, radiated energies are applied in excess of 30, more particularly in excess of 200 $\mu W/cm^2$ per nanometer.

It was known from the Netherlands patent application No. 6,900,810 that to mixtures of ethylene copolymer, tackifying resins, and the usual additives, bonding strength can be imparted by ageing said mixtures and by subsequently exposing them to ultraviolet light filtered through normal window glass. In this Application only one ethylene copolymer is described whose carbon atoms of the C=C bonds positioned in the non-linear part of the polymer chains have three hydrocarbon groups, two of which hydrocarbon groups, which have a geminal relative coupling to these C=C bonds, form part of a cyclic system, notably an ethylene-propylene-ethylidene-norbornene terpolymer. However, a mixture in which said ethylene copolymer is incorporated, together with a tackifying resin and the usual additives, and which, for a day or for a week, has been exposed to UV-light supplied by indirect, bright sunlight filtered through window glass, shows to have a small bonding strength. This is to be attributed, amongst others, to the circumstance that this ethylene copolymer — as established by Applicant — cannot show an elongation at break of more than 500%. Nor has a photosensitizer been applied, in the absence of which only low bonding strength values can be reached. Nothing at all is mentioned about the tensile strength.

It is highly surprising that mixtures based on ethylene copolymers which have highly specific properties as regards elongation at break and tensile strength and which at the same time satisfy special demands made in relation to the structure of the C=C bonds in the sidechains can, in a rapid and efficient manner, be given bonding strength with the aid of a photosensitizer and light in the presence of oxygen.

It has further been found that the use of visible light is to be preferred to UV-light. Therefore, the artificial light source should, at least at a wave length from the visible light, preferably at a wave length smaller than 600 nm, impart a radiated energy to the mixture of at least 2, by preference at least 30, and more particularly at least 200 microwatts/cm² per nm. Although, therefore, visible light is preferred, UV-light may be tolerated in a minor quantity. This applies in particular to UV-light having a wave length in excess of 360 nm. The amount of UV-light to be admitted will depend on the required bonding strength value. For optimum bonding strength values UV-light will, preferably, be avoided as much as possible. Therefore, the total quantity of radiated energy from the UV-light between 200 and 400 nm amounts by preference to at most half, more particularly to at most a fourth part of the total received quantity of radiated energy of the light in the wave length range from 200 to 600 nm.

It has appeared that not only UV-light below 325 nm (which light is stopped by normal window glass) has a detrimental influence on the tack, but that also UV-light between 325 and 400 nm is detrimental to the tack value to be achieved and to the speed at which said value is reached. For this reason the total quantity of received radiated energy by UV-light with a wave length between 325 and 400 nm amounts, preferably, to at most a fourth part, more particularly to at most a sixth part, of the total quantity of received radiated energy of the light in the wave length range from 325 to 600 nm.

It has also been found that there is a maximum as regards the allowable quantity of radiated energy to which the surface of the mixture may be exposed. For instance, it has been established that the bonding strength is quite absent if the mixture, when exposed to light having a wave length of between 200 and 800 nanometers, has received a total radiated energy of more than 15 Joules/cm² per nanometer.

Generally, the time of exposure chosen will have to be so short that the total quantity of radiated energy received is smaller than 5 Joules/cm² per nanometer, since the bonding strength already decreases perceptibly then. For reasons of economy a total irradiation energy of less than 2 is chosen, more particularly of less than 1 Joule/cm² per nanometer, because already at this irradiation energy a maximum bonding strength is reached and further exposure does not yield an improvement and, ultimately, will even lead to a decrease or complete disappearance of the bonding strength.

The exposure may be effected at widely divergent temperatures, for instance from $-50°$ to $+150°$ C., although, by preference, temperatures above 0° C. are applied. It has been found that at an elevated temperature the time during which a satisfactory bonding strength is reached can be appreciably reduced. Preferably, therefore, temperatures are applied which are higher than 35° C., more particularly higher than 50° C.

The maximum temperature, though not limited in principle, is chosen to be less than 150° C. for practical reasons, more particularly less than 135° C. At higher temperatures it is necessary, if vulcanizing agents have been incorporated in the mixture, that the mixture be cooled rapidly to avoid premature vulcanization.

The light sources that may be applied in the process of the invention are not limited. Examples of applicable light sources are, amongst others, sodium lamps, mercury vapour lamps, halogen lamps, fluorescence lamps, xenon lamps, mercury iodide lamps, and incandescent lamps.

If required, the light from these light sources may be filtered to limit the amount of UV-light emitted and keep it within the limits desired.

Of course, the light sources should be so chosen that they are capable of imparting the required, minimum amount of radiated energy to the mixture, for which purpose use can be made of the known appliances to concentrate light, such as reflectors and lenses.

The photosensitizers that may be applied in the process of this invention are numerous. Many divergent kinds of photosensitizers may be applied, like porphyrins, more particularly the porphyrins substituted with aromatic groups, such as tetraphenylporphyrin and meso-naphthyl substituted porphyrins; further, porphyrazines, phthalocyanins, chlorophyl, eosin, methylene blue, methyl violet, fluorescein, hemin, rubrene, acridine, Rose Bengal, and alkyl- and/or aryl-substituted anthracene, tetracene, pentacene, hexacene and haptacene. In general, polynuclear, aromatic compounds, such as rubrene and the substitution products of, for instance, anthracene, naphthacene, benzanthracene and diphenylanthracene, are to be preferred because they are readily available in the form of crude oil fractions rich in aromatics. More particularly, these photosensitizers contain 3 to 100, particularly 3 to 50 aromatic nuclei, which may be substituted, if necessary. Especially the lower-molecular compounds with 3–5 aromatic nuclei should be substituted by alkyl- and/or, preferably, aryl-groups. The sensitizers known for UV-light, like benzophenone, cannot be used in the present process.

The effectiveness of the photosensitizers may be strongly different and depends also on the wave length of the light used. In order to achieve optimum results the photosensitizer applied and the light source used will have to be harmonized.

The amount of sensitizer may vary within wide limits depending on the effectiveness of the sensitizer and of the light source used, but, generally, small quantities will suffice, for instance, between 0.001 and 1% by weight, particularly between 0.01 and 0.5% by weight, referred to the weight of the polymer used. If a photosensitizer is used having a very low effectiveness, more than 1% by weight may be applied, of course, for instance 5% by weight.

The photosensitizer may be applied in different ways. The photosensitizer may be incorporated in one of the components of the mixture prior to the ultimate mixture being prepared, or a so-called masterbatch process may be applied by extending a mixture — in which the photosensitizer is present in a concentrated form — with a mixture in which it is not present. Although admixture in the rubber mixture is strongly preferred, the photosensitizer may also be applied at the surface of the mixture, for instance as a solution in a solvent.

Also two or more photosensitizers may be applied to advantage, to achieve a larger efficiency of the light source. These sensitizers may be applied as a mixture, but they may also be admixed separately.

The greatest preference is for the use of extender oils for rubber already containing one or more photosensitizers. In such a case addition of extra photosensitizers is not necessary. For instance, aromatic oils may be applied in which polynuclear, aromatic hydrocarbons are already present which may act as photosensitizer. Preferably, therefore, aromatic oils are applied which do not show complete transmission at wave lengths greater than 400 nm. By preference, the transmission is smaller than 95%, more particularly smaller than 80% measured at 400 nm in a solution of 74 mg of oil in 100 ml of n-hexane in a 1-cm cuvette.

Applicant assumes — though he does not wish to bind himself to this — that photochemical oxidation of a surface takes place if the surface is irradiated with the proper light in the presence of oxygen and a photosensitizer. Said photochemical oxidation is effected by the action of singlet oxygen — formed from triplet oxygen — on the highly specific unsaturation which is built into the side-chains of the copolymers and which is no longer present after the vulcanization. This is in contrast with an auto-oxidation which proceeds via a radical mechanism and is not selective, like an oxidation with, for instance, ozone and/or ultraviolet light in the presence of oxygen and, possibly, in the presence of an oxidation catalyst, in which decomposition of the polymer surface cannot be avoided.

The rubber-like ethylene copolymer should contain C=C bonds positioned in the non-linear part of the polymer chains, the carbon atoms of which bonds either have two hydrocarbon groups which are in vicinal cis relative positions and which do not form part of the same cyclic system, or, and preferably, have at least three hydrocarbon groups.

It is quite clear that at least one of the hydrocarbon groups of the C=C bonds should form a link with at least one carbon atom of the polymer chain. In that case the hydrocarbon group is considered to include to the carbon atom of the linear part of the polymer chain, the so-called back-bone. The polymers applicable according to the invention are those polymers whose C=C bonds either have two hydrocarbon groups which are in vicinal cis relative positions and which, together, do not form part of the same cyclic system, or, and preferably, have at least three hydrocarbon groups. With, for instance, a copolymer of ethylene, propylene, and dicyclopentadiene these conditions are not satisfied and only a small bonding strength is obtained with application of the process according to the invention, in that case. This also applies to copolymers of ethylene, propylene, and hexadiene 1,4, in which the hexadiene 1,4 is present in the polymer in the trans configuration.

If a polymer is applied whose C=C bonds have two hydrocarbon groups which are in vicinal cis relative positions and which, together, do not form part of the same cyclic system, the hydrocarbon groups may be an aryl-, an aralkyl-, an alkaryl-, a cycloalkyl- or an alkyl-group, preferably with 1–18 carbon atoms and more particularly 1–8 carbon atoms. Examples of polymers having such C=C bonds are those polymers in which hexadiene-1,4, 6-methylheptadiene-1,4, 1-vinyl-4-(propenyl-1)-cyclohexane, 6-phenylhexadiene-1,4, 3-isopropylhexadiene-1,4, and 4(1-butenyl-2)-styrene are incorporated. These monomers must be present in the polymer in the cis configuration. If the C=C bonds contain at least three hydrocarbon groups, which is preferred, said hydrocarbon groups may consist of an alkyl-, a cycloalkyl-, an aryl-, an alkaryl- or an aralkyl-group with, preferably, 1–18 carbon atoms and more particularly 1–8 carbon atoms. Examples of polymers of such unsaturation are those polymers in which the following compounds are incorporated: 5-methylhexadiene-1,4; 4-ethyl-hexadiene-1,4; 4-isopropyl-hexadiene-1,4; 4,5-dimethylhexadiene-1,4; 5-methyloctadiene-1,5; 6-methyloctadiene-1,5; 6-methylheptadiene-1,5; 5,7-dimethyloctadiene-1,5; 4,5-dipropyloctadiene-1,4; 5-propyl-6-methylheptadiene-1,5; 6-phenyl-4-propylhexadiene-1,4; 5-ethyl-7-methyl-octadiene-1,6, and 4-(2-buten-2-yl)-styrene. If the C=C bonds located outside the linear part of the polymer chains contain three or more hydrocarbon groups, also two hydrocarbons which are linked up with these C=C bonds in geminal relative, or in vicinal relative, positions may form part of cyclic systems. Examples of cyclic systems of this kind are the cyclo-octene system, the bicyclo(2,2,1)-heptene system, the bicyclo(2,2,2)-octene system, the dicyclopentadiene system, the tetra-hydro-indene system, the bicyclo(4,4,0)-decadiene system, the bicyclo(3,2,0)-heptene system, and the bicyclo(3,3,0)-octadiene system.

Examples of polymers with this type of cyclic systems are those polymers in which the following monomers are incorporated: 4-methylcyclo-octadiene-1,4; 4-methyl-5-propylcyclo-octadiene-1,4; 5-ethylidenenorbornene-2; 5-propylidenenorbornene-2; 5-butylidenenorbornene-2; 5-isopropylidene-norbornene-2; further, 2-methylnorbornadiene-2,5; 2-propyl-norbornadiene-2,5; 3-heptylnorbornadiene-2,5; 2-ethyl-3-propylnorbornadiene-2,5; and 2-(1',5'-dimethylhexen-4-yl)norbornadiene-2,5; further, 5-isopropylidene-bicyclo(2,2,2)octene-2; 5-ethylidenebicyclo(2,2,2)octene-2; 5-butylenebicyclo(2,2,2)octene-2; further, 2-ethylbicyclo(2,2,2)octadiene-2,5; 2-methyl-3-ethylbicyclo(2,2,2)octadiene-2,5; 2-hexylbicyclo(2,2,2)octadiene-2,5, and 2-(1',5'-dimethylhexenyl-4)bicyclo(2,2,2)octadiene-2,5; further, 5-methyldicyclopentadiene; 4-methyl-5-ethyldicyclopentadiene, and 5-isopropyldicyclopentadiene; further, 3-methyl-4,7,8,9-tetrahydroindene; 2-propyl-4,7,8,9-tetrahydro-indene; further, 1-isopropylidene-4,7,8,9-tetrahydro-indene; 1-(1'-phenyl)ethylidene; 4,7,8,9-tetrahydro-indene; further, 1-isopropylidenebicyclo(4,4,0)decadiene-2,6; 2-isopropylidene-bicyclo(4,4,0)decene-6, and 2-ethylidenebicyclo(4,4,0)decene-6; further, 3-ethylene bicyclo(3,2,0)-heptadiene-2,6, and 3-methylbicyclo(3,3,0)-octadiene-2,6.

The quantity of polyene incorporated in the copolymers according to the invention may vary within wide limits, preferably, however, a quantity of 0.1 to 20% by weight is applied.

It is self-evident that the polyenes which do not yield the required C═C bond structure in the side-chains during copolymerization are little relevant as regards reaching good tack values and that these unsaturated C═C bonds as such do not affect the bonding strength.

The polyenes that do yield the required structure are, by preference, applied in a quantity greater than 0.5% by weight, in particular greater than 1% by weight and smaller than 10% by weight. The best tack values are obtained with quantities in excess of 3% by weight.

The ethylene copolymers applicable according to the invention can in general be prepared by interpolymerization of a mixture of ethylene, at least one other alpha-alkene, and, possibly, one or more polyenes dissolved in an organic solvent whether or not containing halogen, or suspended, with the aid of a coordination catalyst.

For the coordination catalyst a catalyst may be applied which has been formed by combining at least one compound of a metal of the side-groups 4 up to and including 6 or 8 of the periodic system according to Mendelyeev, including thorium and uranium, the so-called heavy-metal component, with a metal, an alloy, a metal hydride or a metal compound of a metal of the groups 1 up to and including 3 or of the fourth main group of this periodic system, the so-called aluminium component, if necessary in the presence of such other materials as small quantities of compounds with free electron couples, for instance water, alcohol, oxygen pr Lewis bases or small amounts of multi-halogenated organic compounds. By preference, a catalyst system is used has been formed by combining vanadium and/or titanium compounds soluble in the solvent, for instance vanadiumoxytrichloride and/or vanadiumtetrachloride and/or titaniumtetrachloride and/or tetra-alkyltitanate with one or more, preferably organic, aluminium compounds, such as aluminiumtrialkyls, dialkylaluminiumhalide, and/or mono-alkylaluminiumhalide, dialkylaluminiummonohydride. Preference is given to application of those aluminiumalkyl compounds which carry an alkyl group with 2 to 8 and, more particularly, with 2 to 5 carbon atoms.

Very good results are obtained with the combination of vanadiumoxytrichloride and alkylaluminiumchloride, particularly alkylaluminiumsesquichloride.

The ratio between the aluminium compound and the heavy-metal compound may be varied within wide limits, for instance between 2 : 1 and 500 : 1, and preferably between 3 : 1 and 25 : 1. In a continuous embodiment of the process the catalyst components may be added directly - dissolved in the distributor - to the polymerization zone.

The ethylene copolymers applicable according to the invention are composed of ethylene, at least one other alpha-alkene, and one or more polyenes. For the other alpha-alkene any copolymerizable alpha-alkene may be applied in the ethylene copolymer, but preferably those which contain 3 to 18 carbon atoms per molecule, and more particularly those which contain 3 to 4 carbon atoms per molecule. Examples of applicable alpha-alkenes are butylene, 4-methylpentene-1, hexene, heptene, and highly particularly propylene. Also mixtures of alpha-alkenes may be incorporated in the ethylene copolymers applicable according to the invention, such as propylene and butylene. The ethylene content of the applicable copolymers lies between 50 and 85 mol.-%. As a rule, ethylene copolymers having the highest tack values will be found at an ethylene content of between 55 and 80 mol.-%, particularly between 60 and 77.5 mol.-%.

The copolymerization reaction is usually effected at a temperature of between −40° and 120° C., by preference between −20° and 80° C. The pressure will as a rule amount to 1 to 50 atmospheres, but also higher or lower pressures may be applied. Preferably, the process is carried out continuously. As solvent any liquid hydrocarbon compound may be applied which is inert to the catalyst used and which, preferably, has 4 to 18 carbon atoms per molecule. Examples of applicable hydrocarbons are saturated aliphatic and cyclo-aliphatic hydrocarbons, like butane, pentane, cyclohexane, hexane, heptane or mineral oil fractions, aromatic hydrocarbons, such as toluene and benzene, and halogenated organic hydrocarbons, like tetrachloroethylene.

Such a temperature and pressure may be applied, to advantage, that one or more of the monomers applied, particularly the alpha-alkene, such as propylene, is in the liquid state and present in such a large quantity that it acts as distributor. Another distributor will not be necessary then.

In general, the molecular weight of the copolymers to be applied in the process according to the invention may be influenced by chain regulators, such as acetylene, hydrogen, butadiene-1,2,zincalkyls, and alkylhalides. By preference, hydrogen is applied as chain regulator. The molecular weights of the rubber-like copolymers usually lie between $5.10^4$ and $5.10^6$. Molecular weight is here understood to be the weight-average molecular weight as measured by means of the light-scattering technique after removal of possibly present gel. The best tack values are reached if the molecular weight value lies between $10^5$ and $10^6$.

The non-vulcanized mixtures of rubber-like copolymers, tackifying resin, and, possibly, additives should have a tensile strength of between 1.5 and 50 kg/cm$^2$, preferably between 2.0 and 30 kg/cm$^2$, and particularly between 3 and 25 kg/cm$^2$. Optimum values are found at tensile strengths below 15 kg/cm$^2$.

To be able to prepare mixtures having these tensile strength values one should start from rubber-like copolymers which, in the non-vulcanized state, already have some tensile strength, also called green strength. In view of, amongst others, the demand made on the elongation at break, said green strength of the undiluted polymer should not be too high. Good tensile strength values lie between 3 and 50 kg/cm$^2$, particularly between 5 and 35 kg/cm$^2$.

Rubber-like copolymers with a tensile strength of between 3 and 50 kg/cm$^2$ generally have an ethylene content of between 50 and 80 mol.-% of ethylene. At higher ethylene contents the tensile strength increases very strongly. Tensile strengths of between 5 and 35 kg/cm$^2$, which are to be preferred, are usually found at ethylene contents of between 60 and 77.5 mol.-% of ethylene. In general, the tensile strength will decrease if the rubber-like copolymer is mixed with a tackifying resin and additives. However, with use of non-excessive quantities of so-called reinforcing fillers, like carbon black, the tensile strength can be maintained at a high level and even be increased. Therefore, if an amount of extender oil is applied, preference will be given to incorporate also an adapted quantity of reinforcing filler, particularly carbon black, in the mixture in order to obtain the required tensile strength. In this way, incorporation of considerable amounts of additives in the mixture is possible, e.g. a total of 200 parts to 100 parts of rubber-like copolymer, whilst the tensile strength of the mixture in the non-vulcanized state yet remains above 2 kg/cm$^2$. For one skilled in the art it is possible by means of a few simple tests to establish how large the quantities of additives to be applied may be in order that the mixture continues to satisfy the demands made on the tensile strength.

Often, also the processing temperature may play a part in relation to the tensile strengths to be achieved. Processing at temperatures of 100° C. and higher may cause the tensile strength to decrease.

As regards these additives allowance will also have to be made for the necessity of keeping the elongation at break above 500%, preferably above 1700%, which is to be discussed below.

The tensile strength and the elongation at break are measured according to NEN 5602 (ring-method) at a rate of 10 cm/min. and a temperature of 23° C. The thickness of the test rings amounted to 2 mm.

The mixtures of rubber-like copolymers, tackifying resins, and fillers applied according to the process of the invention should show an elongation at break amounting to at least 500%, preferably at least 800%, and highly particularly at least 1700%.

In the preparation of such mixtures, of course, copolymers should be started from which, already in the undiluted state, have a substantial elongation at break, for instance in excess of 625%, particularly in excess of 1000%. The highest preference is for copolymers with an elongation at break of more than 1700%.

Copolymers showing these high values for the elongation at break can be prepared according to the processes known in the state of technique, which processes are mentioned elsewhere in this Application. A sufficiently high ethylene content should be provided then, i.e. an ethylene content which usually exceeds 60 mol.-%, preferably exceeding 65 mol.-%.

If the prepared copolymer with, for instance, 66 mol.-% of ethylene should show too low an elongation at break, said elongation at break can be raised to the desired value by incorporation of more ethylene in the copolymer.

Generally, it will not be possible to apply a copolymer whose ethylene content is greater than 85 mol.-% since the elongation at break strongly decreases again at very high ethylene contents, even to below 625%.

By preference, therefore, copolymers are applied having an ethylene content of less than 80 mol.-%, particularly of less than 77.5 mol.-%.

Because the elongation at break of mixtures of rubber-like copolymers and fillers as a rule decreases at an increasing filler content, one should be very careful that not too many fillers be incorporated in the mixture. However, there are also copolymers which, even with considerable amounts of fillers, retain a high elongation value. Generally, these copolymers will show high ethylene contents. In the case of these copolymers the phenomenon may even occur that the elongation at break of the mixture increases through the addition of small quantities of fillers.

Also the phenomenon may occur that the elongation at break of copolymers having high ethylene contents decreases very strongly after admixture with fillers if processing takes place at lower temperatures, for instance lower than 100° C. By increasing the processing temperature, one can avoid this strong decrease however.

With the aid of these guidelines it will be very well possible for one skilled in the art to determine by means of a few simple tests which mixtures are suitable for application according to the present invention.

Of course also mixtures of polymers can be used according to our invention provided that these mixtures show the necessary mechanical properties such as tensile strength and ultimate elongation at break.

Thus an ethylene-propylene-dienepolymer with high tensile strength (green-strength) can be mixed with an ethylene-propylenedienepolymer with low tensile strength and the usual additives such as carbon black and oil in order to obtain a mixture with a tensile strength lying between 1.5 and 50 kg/cm$^2$ and an elongation at break of at least 500%. When such a mixture contains c = c bonds in the non-linear part of the polymer chains with the structure as herebefore defined and the mixture of polymer and tackifier is irradiated with light in the presence of a sensitizer and oxygen excellent tack values can be obtained.

It is also possible to use mixtures of rubberlike polymers of ethylene, propylene and a non conjugated diene with other polymers such as rubberlike polymers of conjugated dienes especially butadiene or isoprene. Examples of these polymers are poly-butadienestyrene, polybutadienes, polyisoprenes, polybutadiene-acrylonitrile polyisobutene-isoprene (butylrubber), and others.

These polymers have high molecular weights for instance in excess of 10.000, preferably over 100.000.

The rubber-like copolymer of ethylene, at least one other alpha-alkene, and one or more polyenes should, by preference, have a thermogram recorded by means of differential scanning calorimetry (dsc) at a cooling rate of 8° C. per minute, in which the heat of crystallization is plotted as a function of the temperature, which shows a maximum at a temperature between −7° and 11° C.

This is especially desirable if the rubber-like copolymer is prepared with the aid of the catalyst combination vanadiumoxytrichloride and alkylaluminiumsesquichloride. Although high tack values are also found with application of other catalyst combinations if the peak in the dsc-thermogram lies at a temperature between −7° and 11° C., suitable tack values can also be found if the peak in the dsc-thermogram lies outside said range, provided, of course, the demands made in relation to the elongation at break and the tensile strength are satisfied.

The occurrence of a peak resulting from a heat effect at a certain temperature in a thermogram recorded by means of differential scanning calorimetry (a d.s.c. curve) indicates that a phase change occurs at that temperature in the material examined. if, in recording d.s.c. curves of rubber-like ethylene copolymers, heated samples are started from, and if these are cooled during the recording of the curves, a peak in the d.s.c. curve points to a change-over from a molten to a crystalline phase and, hence, to the existence of crystallites in the ethylene copolymers examined.

In the case of the rubber-like ethylene copolymers examined by Applicant X-ray diffraction patterns showed that the crystallites occurring in ethylene propylene copolymers are built up of ethylene sequences. Reflections of polypropylene were not observed.

The temperature at which the crystallization peak occurs in the d.s.c. curve for rubber-like ethylene copolymers depends on the length of the ethylene sequences and on the ethylene-sequential length distribution. Since the compositions based on ethylene copolymers and tackifiers yield a very high bonding strength if said compositions contain ethylene copolymers that, in the d.s.c curve with a cooling rate of 8° C./min., give a crystallization peak with a maximum at a temperature of between −7° and +11° C., preferably between −3° and +8° C., and more particularly between 0° and +6° C., it may be assumed that the occurrence of tack is related to the occurrence of ethylene sequences of a very specific length in these ethylene copolymers.

Applicant expects, although he does not want to be bound thereto, that ethylene copolymers are concerned here which behave analogously to ethylene copolymers which have a sufficient number of ethylene sequences with 7 to 9 carbon atoms in the linear part to produce a d.s.c. curve having a peak with a maximum between −7° and +11° C.

The ethylene sequence lengths occurring in ethylene copolymers are, amongst others, dependent on the concentration of the comonomers incorporated in the ethylene copolymer and on the way in which these comonomers are included in the polymer. For instance, it is known that there are great differences in the kinetics of the copolymerization of ethylene and propylene with the various known polyenes, like 1,4-hexadiene and dicyclopentadiene. The distribution of the comonomers in the ethylene copolymer differs for each catalyst system applied in the preparation of the copolymers. For instance, in case of the same incorporation of comonomers merely the variation of the catalyst system may cause the melting temperature of the crystallites present in the copolymer to differ appreciably. Also catalyst additives like Lewis bases and halogenated activating compounds have influence on the melting temperature of the crystallites. In addition, also the polymerization conditions, like pressure, temperature, polymerization time, solvent, and stirring intensity, are determinative with respect to the ethylene sequence length and the ethylene sequence length distribution occurring in the ethylene copolymer. It will be clear, therefore, that in the case of a certain catalyst system only very special combinations of polymerization conditions and comonomer incorporation will yield ethylene copolymers which produce a crystallization peak with a maximum between −7° and 11° C. and which can be applied in the compositions based on ethylene copolymers and tackifiers with a high bonding strength.

It will be clear from the above that a process for preparing these ethylene copolymers, which are applicable according to the invention, cannot be characterized merely on the basis of the comonomer incorporation and the catalyst system applied, because, in addition to these factors, also the polymerization conditions are determinative with respect to the ethylene sequence lengths occurring in the ethylene copolymer formed. It has also appeared impossible to obtain a general relationship between the various polymerization parameters that are of importance and the position of the crystallization peak in the d.s.c curve and, hence, the ethylene sequence length. Below, therefore, a generally working method is described with the aid of which it will be possible for one skilled in the art to prepare ethylene copolymers yielding a crystallization peak with a maximum lying at the required temperature.

For each combination of catalyst system and polymerization conditions can be determined in the following way how these ethylene copolymers can be prepared. At a certain catalyst system and at chosen polymerization conditions a series of batch-tests is conducted in which only the concentration of comonomers in the monomer mixture to be polymerized, for instance that of the alpha-alkene, is varied. Subsequently, a d.s.c. curve is recorded for the ethylene copolymers so obtained. By variation of only the concentration of one of the comonomers, the ethylene sequence length and, hence, the temperature at which the maximum of the crystallization peak occurs in these curves, will vary. Next, the content of incorporated comonomer of the ethylene copolymers obtained is determined, whereupon the temperature at which the maximum of the crystallization peak occurs in the d.s.c. curve is plotted graphically against the content of comonomer built up in the ethylene polymer. In this way a relationship is obtained between the temperature at which crystallization of crystallites occurs in the ethylene copolymer and the content of incorporated comonomer. It may be assumed that at a 100% ethylene incorporation the crystallization will take place at about 130° C. (the crystallization temperature of polyethylene). The function so obtained is continuous; the area examined by Applicant could be considered linear for practical purposes. From this relationship can be derived at which concentration of incorporated comonomer, with the catalyst system chosen, and under the reaction conditions chosen, rubber-like ethylene copolymers are obtained producing a crystallization peak in the d.s.c curve within the required temperature range. Realization of ethylene copolymers with such a comonomer content is possible for one with average skill in the art. A method of this kind is applicable for any catalyst system and for any combination of polymerization conditions.

The compositions according to the invention should contain one or more tackifing resins, so-called tackifiers. For tackifier any compound may be applied in the compositions according to the invention which if added to the ethylene copolymers increases the bonding strength of these copolymers. Organic cyclic resins containing at least one polar functional group and whose molecular weight amounts to at least 200 are high suitable. These resins may, for instance, be isoprenoid resins, terpenoid resins, phenol-aldehyde resins, phenol-acetylene resins or alkylated phenol resins.

Examples of well-applicable tackifiers are terpenes, compounds derived from abietinic acid, pimaric acid, Diels-Alder reaction products of isoprene with piperylene, butadiene, dicyclopentadiene or mixtures. Alkylated phenol resins may be applied to advantage, for instance the resins known by the trade names of 'Amberol ST 140 F, Durez 19900, and Resin 7521'. These tackifiers - which are given the highest preference in the process of the present invention - belong to the group of condensation products of formaldehyde with alkyl phenol having a molecular weight of between 200 and 3000, particularly between 300 and 2000, in which the alkyl group contains 1 to 30, more particularly 8 to 12 carbon atoms. By preference, said alkyl group is highly branched. Examples of suitable alkyl groups are: 1,1,3,3-tetramethylbutyl, 1,3,5-trimethylhexyl, and 1,3,5,7-tetramethyloctyl. Also modifications of such resins may be applied, for instance the condensation products of alkyl phenol with $SCl_2$ or $S_2Cl_2$. Also mixtures of tackifiers may be applied. In the compositions according to the invention the tackifier may be applied in quantities of between 1 and 25% by weight, referred to the ethylene copolymer, although, preferably, only relatively small quantities, - in comparison with the state of technique - for instance of 2 to 10% by weight, are applied.

The compositions according to the invention may also contain one or more vulcanizing agents. For vulcanizing agents in the composition according to the invention the usual vulcanizing agents may be applied, like sulphur and peroxides. The quantity of vulcanizing agent that may be incorporated in the compositions according to the invention may vary within wide limits. As a rule, quantities are applied lying between 0.5 and 5% by weight referred to the amount of ethylene copolymer incorporated in the composition; preferably, quantities of between 0.5 and 2% by weight are applied. The compositions according to the invention may also contain, besides vulcanizing agents, one or more vulcanization accelerators, such as zincdiethylcarbamate, tetramethylthiuramdisulphide, 2-mercaptobenzthiazole, and activators like diethyleneglycol. The rubber-like copolymers may be vulcanized in the usual manner.

The compositions according to the invention may further contain the usual fillers and pigments. Examples of applicable fillers and pigments are carbon black, finely divided silica, precipitated chalk, precipitated aluminium silicate, magnesium silicate, titanium dioxide, and kaolin. Said substances are, as a rule, added in quantities lying between 10 and 500, and more particularly between 25 and 250% by weight, referred to the amount of ethylene copolymer incorporated in the compositions.

The compositions according to the invention may also contain oils. Said oils may be naphthenic, paraffinic, as well as aromatic in character. By preference, aromatic oils are applied, since application of these oils yields the highest bonding strengths. The aromatic content preferably exceeds 40%. Most preference is for oils which when dissolved in hexane in a concentration of 0.74 g per liter show a transmission at 400 nm of less than 70%. Usually, the oils are incorporated in the compositions according to the invention in quantities of between 5 and 200% by weight, referred to the amount of rubber-like polymer incorporated in the composition, preferably, however, in quantities of between 10 and 100% by weight.

The tack values mentioned in this Patent Application have been measured on a tack-meter developed by DSM, which meter is described in SGF Publ. no. 35: News on EPDM and general information of rubber technology. Briefly, the method described in this article comes to the following.

Strips of a certain shape are manufactured with the aid of a small plunger-extruder with an electrically heated cylinder (100° C.).

These strips are subsequently exposed to light having a wave length between 200 and 800 nanometers. The strips are then carefully covered with aluminium foil, so that light can no longer influence them during any subsequent storage at room temperature in a low-dust space. If the strips are not covered they receive an extra amount of light when stored, as a result of which there is a risk of the tack strongly reducing or disappearing altogether. Following this period, a strip is wound on a cylinder which has previously been provided with adhesive tape, pointing outwards with its adhesive side. Subsequently, a second winding is applied to the first one, the second being ultimately pressed on the winding first applied. To this end the cylinder and the strips applied to it are given a constant peripheral speed of about 170 mm/min. and the strips are pressed together by pressing on a freely rotatable cylinder at a constant load of 1500 grams during one complete rotation.

After the strips have been pressed one time along the entire circumference of the first cylinder the pressing cylinder is removed. Now the second winding is retained solely by tack. The width of the contacting surface area between the first and the second winding amounts to 5 mm. After the second winding has been applied and after the pressure has been applied, the end of the second winding is connected to a draw bench and the force is measured - at room temperature - required to unwind the second rubber strip from the first one. In order to avoid that the non-vulcanized, second rubber strip, which is connected to the draw bench, starts stretching, the second winding and the clamping section are provided with adhesive tape, the adhesive side of the tape pointing towards the rubber surface.

The unwinding speed has been defined at 1 cm/min. The unwinding length over which the tack is measured amounts to about 125 mm.

The d.s.c. curves described in the Patent Application have been recorded with a differential scanning calorimeter marketed by Perkin Elmer under the trademark of Perkin Elmer DSC 1 B, starting from ethylene copolymer samples of about 24 mg which, prior to the recording, were heated to 100° C. The d.s.c. crystallization thermogram was recorded at a cooling rate of 8° C. per minute.

For the performance of the measurements mentioned in this Patent Application, the temperature scale of the differential scanning calorimeter had been calibrated with the aid of the following gauge substances: n-octane, norbornadiene, n-pentadecane, p-xylene, n-hexadecane, n-eicosane, n-tetracosane, pentaerythritoltetrastearate, n-octapentacositane, and indium. The melting temperatures obtained by heating these compounds at a rate of 8° C./min. were considered to be equal to the equilibrium temperatures. The purpose of the following examples is to explain the invention in more detail without limiting it in any way.

EXAMPLE I

A number of ethylene-propylene copolymers were prepared in hexane as solvent with the aid of a catalyst formed by combining $VOCl_3$ and ethylaluminiumsesquichloride (SEAC). During the polymerizations the temperature amounted to 36° to 42° C. and the reactor pressure was kept at a constant value of 2 ats g. The catalyst components were supplied continuously in such a way that the $VOCl_3$ and SEAC concentrations in the reactor amounted, respectively, to 0.125 and 1.25mmoles per liter.

A mixture of propylene and ethylene was supplied in a volumetric ratio which, in the various experiments, varied from 0.71 to 1.05. After an average residence time in the reactor of 15 minutes the solution was treated with hot water, in which the copolymer was recovered in the form of crumb. The results of these experiments are given in table I.

Table I

| No. of test | propylene content % by w. | DSC peak | green strength kg/cm² | tack value g/5 mm |
|---|---|---|---|---|
| 1 | 32 | +13° C | 22 | 60 |
| 2 | 33 | +7° C | 18 | 120 |
| 3 | 36 | +1° C | 4.5 | 1100 |
| 4 | 36 | −2° C | 2.5 | 700 |
| 5 | 37 | −4° C | 3 | 600 |

The tack values of these copolymers were determined of rubber compositions prepared according to the following, general recipe:

| polymer | 100 | parts by weight |
|---|---|---|
| zinc oxide | 5 | |
| stearic acid | 1 | |
| FEF carbon black | 50 | |
| Sundex 790* | 40 | |
| zincdibutyldithiocarbamate | 2 | |
| 2-mercaptobenzthiazole | 0.5 | |
| tetramethylthiuramdisulphide | 0.5 | |
| sulphur | 1.5 | |
| Amberol ST 140 F** | 5 | |

*Aromatic oil marketed by Sun Oil, with a density of 0.979, an aniline point of 117° F, and an aromatic content of 68.4 % by weight. This aromatic oil contains a number of fractions that, partly, consist of polynuclear aromatic compounds having a strongly photosensitizing action.
**A tackifier resin formed by polycondensation of a branched octyl phenol and formaldehyde.

Of the compositions prepared strips were than made which were exposed to two white fluorescence lamps of 20 Watts (type W 33) at a distance of 10 cm for 4 hours. The maximum intensity of this light source amounted to 205 $\mu$W per $cm^2$ per nm at 580 nm and to 64 $\mu$W at 480 nm. The total amount of radiated energy from the UV-light with a wave length of between 200 and 400 nm amounted to the 16th part of the total quantity of radiated energy of the light in the wave length range from 200 to 600 nm. The total amount of radiated energy received, which was supplied by the UV-light of 325 to 400 nm, amounted to the 14th part of the total quantity of radiated energy of the light in the wave length range from 325 to 600 nm.

After the exposure the tack measurements were conducted in the way already described. The results thereof are also mentioned in table I.

From these results it may be concluded that these copolymers show only small tack values because the required C=C bonds are lacking.

EXAMPLE II

Copolymers of ethylene, propylene, and 5-ethylidenenorbornene-2 with a different dsc-peak temperature were mixed according to the recipe of example I.

Next, strips were made from these mixtures, which strips were carefully screened off from the light during a subsequent 24-hour storage period.

These strips were then subjected to tack measurements. The results thereof and the mechanical properties are given in table II.

Table II

| DSC peak temperature | tack value g/5 mm | polymer, max. tensile strength kg/cm² | polymer, elongation at break % | mixture, max. tensile strength kg/cm² | mixture, elongation at break % |
|---|---|---|---|---|---|
| −18° C | 250 | >6.9 | >1700 | 1.6 | 210 |
| −16 | 220 | 1.8 | 430 | 1.4 | 120 |
| −9 | 70 | 13.1 | 1340 | — | — |
| −1 | 600 | >3.5 | >1400 | — | — |
| +1 | 700 | >19 | >1700 | 3.0 | 1230 |
| +2 | 890 | >16.8 | >1700 | 3.0 | 1160 |
| +5 | 1175 | 35 | 1460 | >6.4 | >1700 |
| +19 | 150 | 81 | 730 | 105 | 1040 |

From these results appears that the highest bonding strength values are found at dsc-peak temperatures of between −7° and +11° C., particularly of between −3° and +8° C., if the light was carefully screened off. The highest tack value is reached at an elongation at break in excess of 1700%. At tensile strengths in excess of 50 kg/cm² a low tack value is obtained.

EXAMPLE III

A copolymer of ethylene, propylene, and dicyclopentadiene was prepared according to the process of example I, on the understanding that the temperature amounted to 35° C. and the propylene to ethylene ratio to 1.05. The dicyclopentadiene concentration in the reactor was 22 mmoles per liter.

The polymer formed and the mixture prepared thereof had the following composition and properties:

| propylene content | 34 % by weight |
|---|---|
| dicyclopantadiene content | 5.8 % by weight |
| green strength | 29 kg/cm² |
| elongation at break | 840 % |
| DSC peak | +3 ° C |
| tensile strength, mixture | 4.5 kg/cm² |
| elongation at break, mixture | 1350 % |

After preparation of a composition according to the recipe of example I and the exposure of the strips with 2 fluorescence lamps (W 33) of 20 Watts, also according to example I, a tack value was measured of 400 g/5 mm.

From this result it is quite evident that copolymers containing dicyclopentadiene for third monomer show only low tack values.

EXAMPLE IV

The following compositions were prepared from an ethylenepropylene-5-ethylidenenorbornene-2-copolymer - prepared in the way mentioned in example I - with a DSC peak temperature of +5° C., a propylene content of 28% by weight and a third monomer content of 9% by weight:

A. A composition was prepared according to example I, in which no tackifier resin was applied however. The composition was exposed in the way described in example I.

B. Four compositions were prepared according to the recipe of example I, whereupon they were exposed in different ways:

B1. One composition was exposed to a 2 × 20 W fluorescence light source (W 33, white) at a distance of 10 cm;

B2. One composition was exposed to a 2 × 20 W fluorescence light source (G 17, green) at a distance of 10 cm;

B3. One composition was exposed to a 2 × 20 W fluorescence light source (R 15, red) at a distance of 10 cm;

B4. One composition was kept carefully screened off from the light.

In the non-vulcanized state, the following properties were found:

| | |
|---|---|
| tensile strength, polymer | 35 kg/cm² |
| elongation at break, polymer | 1460 % |
| tensile strength, mixture | >6.4 kg/cm² |
| elongation at break, mixture | >1700 % |

The measured tack values (in g per 5 mm) are given in table III. From these results appears that both a tackifier and exposure are necessary to obtain high tack values.

It also appears from these results that only limited tack values can be obtained with the red light (with wave lengths above 600 mm). Although equally high tack values are achieved with the white and the green light, the white light produces these tack values at a slightly higher rate.

Table III

| time of exposure hours | A no tackifier | B1 white light | B2 green light | B3 red light | B4 no light |
|---|---|---|---|---|---|
| ½ | — | 2,800 | — | — | — |
| 1 | — | 8,000 | 1,200 | 800 | — |
| 2 | 260 | 16,000 | 10,000 | 1,000 | 600 |
| 4 | 260 | 15,400 | 15,600 | 1,100 | 600 |
| 5 | — | — | — | — | 600 |
| 6 | — | 15,800 | 16,100 | — | — |
| 16 | — | — | — | 1,400 | — |
| 18 | 160 | 16,800 | 15,200 | — | 700 |
| 24 | — | 0 | 12,000 | — | — |
| 30 | — | 0 | 0 | — | — |

(—) not measured

EXAMPLE V

Of a number of ethylene-propylene-5-ethylidenenorbornene-2-copolymers compositions were prepared according to the recipe of example I.

Exposure was effected with 4 fluorescence lamps of 40 W (W 33) at a distance of 1 meter for 6 hours.

The results were as follows:

| DSC-peak temperature | tack value g/5 mm | tensile strength polymer kg/cm² | elongation at break polymer % | tensile strength mixture kg/cm² | elongation at break mixture % |
|---|---|---|---|---|---|
| −37° C | 520 | 2.1 | 570 | 1.3 | 350 |
| −18° C | 520 | >6.9 | >1700 | 1.6 | 210 |
| +2° C | 4400 | >16.8 | >1700 | 3.0 | 1160 |
| +5° C | 8500 | 35 | 1460 | >6.4 | >1700 |
| +19° C | 480 | 81 | 730 | 105 | 1040 |

From these results the conclusion may be drawn that high tack values are reached if the mechanical properties satisfy the demands made and if the DSC peak lies in the temperature range from −7° to +11° C.

EXAMPLE VI

A copolymer as in example IV was started from, compositions being prepared thereof according to the recipe of example I. The exposure was carried out with an SP 500 mercury-vapour lamp yielding a maximum energy of over 5,000 μW per nm per cm² at 435 nm. The total light energy between 325 and 400 nm amounted to 20% of the light energy between 325 and 600 nm. The total light energy between 200 and 400 nm amounted to 30% of the total quantity of light energy between 200 and 600 nm.

With the aid of filters it was seen to that in the one case the UV-light was filtered off below 325 nm and in the other below 395 nm.

The results of the tack measurements are mentioned in table IV. From these results appears that it is advantageous to suppress the UV-light, although a certain amount may be tolerated without too strongly disadvantageous effects resulting therefrom.

Table IV

| time of exposure in min. | light with γ>325 nm | light with γ>395 nm |
|---|---|---|
| 0 | 440 g/5 mm | 440 g/5 mm |
| 1 | 640 | 1,000 |
| 5 | 800 | 6,400 |
| 10 | 7,000 | 14,800 |
| 20 | 11,000 | 13,900 |
| 30 | 9,600 | — |
| 60 | 10,800 | — |
| 120 | 12,200 | — |

EXAMPLE VII

A mercury iodide lamp (HPI/T 375 W) was applied as light source in the exposure of a composition as in example VI. The maximum light energy amounted to 8,600 μW per nm per cm² at 540 nm at a distance of 15 cm.

The total light energy between 200 and 400 nm amounted to the twenty-fifth part of the total light energy between 200 and 600 nm.

The total light energy between 325 and 400 nm amounted to the thirtieth part of the total light energy between 325 and 600 nm.

The results of the tack measurements are mentioned in table V.

Table V

| time of exposure in sec. | tack in g/5 mm |
|---|---|
| 0 | 800 |
| 60 | 2,000 |
| 1.5 × 60 | 5,400 |
| 2 × 60 | 13,600 |
| 5 × 60 | 13,600 |
| 10 × 60 | 10,000 |
| 20 × 60 | 10,400 |

EXAMPLE VIII

In order to be able to make a comparison between the tack values obtained with the present invention and the tack values obtained with natural rubber (natural rubber has of old been known for its good tack) and with SBR to which the Koresin tackifier usual for SBR has been added, the following two compositions were prepared:

| | | |
|---|---|---|
| NR (sheet I) | 100 | — |
| SBR 1500 | — | 100 |
| Rhenacit [1] | 0.15 | — |
| ZnO | 3 | 3 |
| Stearic acid | 2 | 2 |
| PBN [2] | 1 | 1 |
| PEF carbon black | 50 | 50 |
| Sundex 790 | 15 | 15 |
| Koresin [3] | — | 5 |
| Vulc. CZ [4] | 1.0 | 1.2 |
| Sulphur | 2.0 | 1.75 |

The tack measured amounted in the case of: natural rubber to 2600 – 4600 g/5 mm, depending on the extent of decomposition on the roll, SBR to 600 g/5 mm.
[1] zinc salt of pentachlorothiophenol
[2] phenyl -β-naphthylamine
[3] condensation product of acetylene and tert. butyl phenol
[4] conversion product of mercaptobenzthiazole and cyclohexylamine

EXAMPLE IX

In order to investigate the influence of the temperature on the tack two compositions were prepared according to example IV. The two compositions were exposed in the way of example I, in which the one strip was kept at 20° C. and the other was heated to 80°.

The results are given in table VI. From these results appears that high tack values are obtained more rapidly at an elevated temperature.

Table VI

| time of exposure in hours | tack value in g/5 mm | |
|---|---|---|
| | 20° C | 80° C |
| 0.5 | 2,000 | 3,000 |
| 1 | 6,000 | 12,800 |
| 1.5 | 12,400 | 14,000 |
| 2 | 18,800 | 16,400 |

EXAMPLE X

The influence of the storage time on the tack values was investigated by keeping the mixture according to example IV B1 - which had been exposed for 4 hours - shut off from the light and by measuring the tack at fixed intervals. The tack values are given in table VII.

Table VII

| keeping-time in weeks | tack g/5 nunm |
|---|---|
| 0 | 15,200 |
| 2 | 14,800 |
| 3.5 | 15,200 |
| 5 | 13,000 |
| 9 | 13,500 |

These values show that the bonding strength hardly deteriorates as time passes.

EXAMPLE XI

An ethylene-propylene-ethylidenenorbornene copolymer according to example IV was mixed according to the recipe of example I.

Next, strips were made of this composition, which strips were submersed in a solution of $1.5 \cdot 10^{-4}$ mol. tetraphenylporphyrin in 1 l. of dichloromethane. The absorption after the sumbersion amounted to 300 mg of solution, i.e. $0.5 \cdot 10^{-7}$ mol. per 30 cm$^2$.

Strips were also prepared whilst tetraphenylporphyrin had been included in the mixing-recipe in that the photosensitizer had been included in the oil beforehand. To every 100 g of rubber $2 \cdot 10^{-4}$ respectively $4 \cdot 10^{-4}$ mol. of photosensitizer was admixed.

The exposure was effected as in example I.

The results of the tack measurements are given in table VIII.

Table VIII

| | tack value in g/5 mm | | | |
|---|---|---|---|---|
| time of expos. in min. | submersed in photo-sensitizer solution | $2.10^{-4}$mol. photosensitizer admixed | $4.10^{-4}$mol. photosensitizer admixed | without extra-photo-sensitizer |
| | g/5 mm | g/5 mm | g/5 mm | g/5 mm |
| 0 | 1,200 | 600 | 700 | 900 |
| 5 | 2,400 | 1,400 | 3,400 | — |
| 10 | 7,500 | 11,800 | 12,600 | — |
| 25 | 13,500 | 15,400 | 10,200 | 2,000 |
| 60 | 16,200 | 12,800 | 12,800 | 6,000 |
| 2 × 60 | 19,000 | 13,600 | 14,000 | 18,800 |

These results show that addition of extra sensitizer results in the time within which good tack values are obtained being considerably reduced.

EXAMPLE XII

Example XI was repeated, the exposure being effected with a mercury iodide lamp (HPI/T 375 W). The light source used had a maximum intensity of 8600 μW per cm$^2$ per nm at 540 nm. The total quantity of radiated energy from the UV-light with a wave length of between 200 and 400 nm amounted to the twenty-fifth part of the total quantity of radiated energy of the light in the wave length range from 200 to 600 nm. The total received amount of light energy supplied by the UV-light of 325 to 400 nm amounted to the thirtieth part of the total quantity of radiated energy of the light from the wave length range from 325 to 600 nm.

Two mixtures were prepared at which $2 \cdot 10^{-4}$ mol. tetraphenylporphyrin were admixed per 100 g of rubber. In one of the mixtures no tackifier was incorporated.

The results of the tack measurements are given in table IX.

Table IX

| time of exposure in sec. | with extra photo-sensitizer without tackifier | with extra photo-sensitizer with tackifier | without extra photo-sensitizer with tackifier |
|---|---|---|---|
| 0 | 80 g/5 mm | 800 g/5 mm | 800 |
| 10 | — | 2,800 | — |
| 15 | — | 5,200 | — |
| 30 | — | 9,600 | — |
| 60 | 80 | 9,400 | 2,000 |
| 2 × 60 | 80 | 9,500 | 13,600 |
| 5 × 60 | — | 11,000 | 13,600 |
| 10 × 60 | 80 | 12,600 | 10,000 |
| 20 × 60 | 80 | 14,000 | 10,400 |

These results show that a tackifier is necessary to achieve tack. It also appears that within a very short time high tack values can be obtained by making use of a mixture of sensitizers.

EXAMPLE XIII

A number of ethylene-propylene-ethylidenenorbornene copolymers were prepared according to the process of example I. Compounding as well as irradiation were carried out according to the specifications of example I.

The properties of copolymers and of the mixtures prepared therefrom, as well as the results of the tack measurements, are mentioned in table X.

Table X

| polymer | I | II | III | IV | V |
|---|---|---|---|---|---|
| propylene content, % by w. | 34 | 30 | 29 | 28 | 28 |
| EN content, % by w. | 4.2 | 5.9 | 6.8 | 8.2 | 5.4 |
| DSC temperature, °C | +1 | +3 | +5 | +5 | +8.5 |
| polymer tensile strength, kg/cm$^2$ | >13.4 | >26.2 | 36 | 35 | 54 |
| elongation at break, % | >1700 | >1700 | 1400 | 1460 | 1060 |
| mixture tensile strength, kg/cm$^2$ | >2.3 | >5.1 | >6.0 | >6.4 | 38 |
| elongation at break, % | >1700 | >1700 | >1700 | >1700 | 1480 |
| tack value, g/5 mm | 9400 | 10,400 | 13,200 | >13,400 | 1620 |

The results of table X show that the tack value decreases rapidly as the DSC temperatures increase. It further appears that mixtures in which copolymers are incorporated which have the same propylene contents but different DSC temperatures show greatly differing tack values. It appears in addition that the tack value decreases rapidly if the tensile strength of the mixture approaches the value of 50 kg/cm$^2$.

EXAMPLE XIV

Mixtures were prepared according to the recipe of example I, starting from the copolymer described in example IV, the only variation being that various tackifier resins were applied in a quantity of 5 parts per 100 parts of copolymer.

All tackifiers were of the same type, viz. condensation products of alkylphenol and formaldehyde with molecular weights within the range of 500-2000.

The alkyl groups contained 8-12 carbon atoms and were strongly branched.

The mixtures were subsequently exposed in the way described in example I. The results of the tack measurements are mentioned in table XI.

Table XI

| Tackifier | tack value g/5 mm |
|---|---|
| I. Amberol ST 140 F (Rohm & Haas, USA) | 14,000 |
| II. Durez 19.900 (Hooker Chemicals, USA) | >14,000 |
| III. Resin 7521 (Rousselot S.A., Paris) | >10,000 |

These results show that tackifier I. may be replaced by tackifiers of a different origin without disadvantageous consequences.

EXAMPLE XV

Different types of oil were applied in the general mixing-recipe of example I, the copolymer described in example IX being applied.

The mixtures were also exposed for 4 hours according to the method of example I, whereupon the degree of the tack was determined.

The results are given in table XII.

Table XII

| type of oil | aromatic content in % by weight according to clay-gel method | percentage of transmission at 400 nm % | tack value g/5 mm |
|---|---|---|---|
| paraffinic oil | 0 | 100 | 320 |
| 451 HP Shellfex 68 | 25.6 | 100 | 320 |
| Sunpar 150 | 14.1 | 100 | 340 |
| Flexon 391 | 66.5 | 94 | 3600 |
| Sundex 790 | 68.4 | 65 | >15,000 |
| Dutrex 55 | 78.2 | 65 | >15,000 |
| Sundex 8125 | 72.2 | 52 | >15,000 |

These results show that the influence of the oil is extremely great. Decisive for the effect of the oil is the transmission measured at 400 nm of a solution of 74 mg of oil in 100 ml of n-hexane in a 1-cm cuvette.

This transmission should be less than 100%, preferably however less than 95%. The best results are obtained with oils showing a transmission of less than 80%.

EXAMPLE XVI

In this example the influence is shown of a diamine anti-ozonant on the provision of bonding strength. This type of anti-ozonant is known to be capable of suppressing singlet-oxygen reactions. To this end a mixture was prepared and exposed at 20° C. in the way described in example IX. Also a second mixture was treated according to the process of example IX, the only difference being that the irradiation took place under nitrogen, as a result of which singlet-oxygen reactions were excluded. In the case of a third mixture, also 1 part of N-cyclohexyl-N'phenyl-p-phenylene-diamine was admixed in the mixture according to example IX per 100 parts of copolymer. The exposure took place in the same way as in example I.

The results are given in table XIII.

Table XIII

| tack value, g/5 mm | exposure time, in hours | | | |
|---|---|---|---|---|
| | 0 | 1 | 2 | 4 |
| normal exposure | 600 | 2450 | >10,600 | >15,000 |
| exposure under N$_2$ | 200 | 340 | 440 | 750 |
| normal exposure, in the presence of 1 part of anti-ozonant | 480 | 800 | 2,600 | 3,600 |

EXAMPLE XVII

In this example the influence is checked of increasing quantities of filler on the mechanical properties and the tack values of the mixture. The copolymer of example IV was for that purpose admixed and exposed according to example I (I). Also a mixture (II) was prepared in which the amount of carbon black was increased to 70 parts and the amount of oil to 50 parts. A third mixture (III) was prepared in which 100 parts of carbon black and 70 parts of oil were applied. The results are mentioned in table XIV below.

Table XIV

| mixture | carbon black | oil | tack value | tensile strength | elongation at break |
|---|---|---|---|---|---|
| I | 50 | 40 | 15,000 g/5 mm | 2.8 kg/cm$^2$ | >1700 % |
| II | 70 | 50 | 8,000 | 2.2 | >1700 |
| III | 110 | 70 | 4,000 | 2.1 | 820 |

These results show that even with large amounts of carbon black and oil high tack values can be reached if the tensile strength and the elongation at break satisfy the demands made.

EXAMPLE XVIII

A copolymer of ethylene, propylene, and 5-ethylidenenorbornene-2, having a DSC-peak temperature of +5.5° C., a tensile strength of 42 kg/cm$^2$, and an elongation at break of 1390% was admixed with additives according to the recipe of example I, on the understanding that instead of 40 parts of Sundex 790 oil 30 parts of Sunpar 150 oil were applied. The mixture was divided into two parts, 4.10$^{-4}$ mol. of tetraphenylporphyrin being added to the one part and admixed. Next, the two mixtures were exposed for 1 and 2 hours according to example I. For the sake of comparison also a test was conducted with application of 40 parts of Sundex 790. The mechanical properties of the mixtures showing no differences were as follows: tensile strength in excess of 8.1 kg/cm$^2$; elongation at break larger than 1700%. The results of the tack measurements are mentioned in table XV.

Table XV

| Mixture with : | tack after 1 hour | tack after 2 hours |
|---|---|---|
| Sunpar 150 | 250 | 400 |
| Sunpar 150 and 4.10$^{-4}$ mol. of TFP | 5800 | 3200 |
| Sundex 790 | — | >11,200 |

The results of table XV show that also paraffinic oils may be applied provided a photosensitizer is incorporated in the mixture.

EXAMPLE XIX

Copolymers were prepared from ethylene, propylene, and 5-ethylidenenorbornene-2(EN) according to example I, on the understanding that for catalyst a mixture of diethylaluminiumchloride and vanadiumoxytrichloride was applied.

The copolymer obtained had an ethylene content of 67.6 mol.-% and a DSC temperature of −7° C. The EN content amounted to 5.1% by weight. Depending on the temperature at which the test plates were compressed, the tensile strength of the polymer amounted to 11.9 to 17.7 kg/cm$^2$, the elongation at break amounting to 880 to 1550%. In either case the highest values were obtained at the highest compression temperature (140° C.). After admixture of the rubber-like copolymer with 50 parts of carbon black and 40 parts of oil according to the recipe of example I, a tensile strength was reached of 24.6 kg/cm$^2$ and an elongation at break of 140% if the mixing was carried out at 80° C. This mixture, after having been exposed for 0, 2 and 4 hours according to example I, showed only a very low tack value, respectively of 60, 100 and 100 g/5 mm. If the mixture was prepared at a temperature of 140° C., whilst vulcanizing agents were left out of the mixture to avoid premature vulcanization, the tensile strength exceeded 6.5 kg/cm$^2$ and the elongation at break exceeded 1700%. If the mixture was tested after exposure tack values of 1100, >4600, and >5400 g/5 mm were found after exposure for, respectively, 4, 6, and 8 hours.

EXAMPLE XX

A copolymer was prepared according to example XIX, the ethylene content of the product obtained amounting to 76.1 mol.-% and the EN content to 5.1% by weight. The DSC temperature amounted to +21° C. The tensile strength and the elongation at break of the polymer depended on the temperature at which the test plates were prepared, see table XVI. After exposure according to the method of example I it was tried to measure the tack. The tack value was so small that bonding did not occur at all.

Table XVI

| compression temperature | 80° C | | 140° C | |
|---|---|---|---|---|
| | tensile strength kg/cm$^2$ | elongation at break % | tensile strength kg/cm$^2$ | elongation at break % |
| polymer | 50 | 450 | 72 | 640 |
| mixture | 67 | 210 | 93 | 940 |

EXAMPLE XXI

In the way of example XIX, a copolymer was prepared with an ethylene content of 64.3 mol.-% of ethylene. The EN content amounted to 5.9% by weight, the DSC temperature to −12° C. the tensile strength of the polymer amounted to 8.0 kg/cm$^2$, and the elongation at break to 1160%. After admixture with carbon black and oil according to example I, a tensile strength was measured of 23 to 3.6 kg/cm$^2$ and an elongation at break of 130 to >1700%. The lowest tensile strength value and the highest value for the elongation at break were found if the test plates had been compressed at 160° C. If this polymer was subjected to the usual exposure according to example I a tack value was reached of >5200 g/5 mm. The polymer mixture compressed at 80° C. (tensile strength 23 kg/cm$^2$ and elongation at break 130%) showed very low tack values, respectively of 250 and 300 g/5 mm after exposure for 2 and 4 hours. These results clearly show that high tack values can be reached if the mixtures satisfy the demands made on the tensile strength and the elongation at break.

EXAMPLE XXII

The following polymers were used. All polymers are copolymers of ethylene, propylene and ethylidenenorbornene (EN). From each polymer is listed:
  a. the composition (weight percent ethylene, propylene and EN).
  b. the mooney viscosity (ml × (1 + 4) 125° C.
  c. dsc temperature
  d. tensile strength and elongation at break of polymer
  e. tensile strength and elongation at break when compounded according to the compounding receptuie in the application example 1.

| | Polymer A. | Polymer B. | Polymer C. | Polymer D. |
|---|---|---|---|---|
| a. | 52, 38, 10 | 62, 28, 10 | 63, 28, 9 | 64, 31, 5 |
| b. | 68 | 59 | 58 | 54 |
| c. | not measurable | +4.5 °C | +7 °C | +7.5 °C |
| d. | 2.7, 290 % | >3.2 >2365 % | 44, 1800 % | 47, 1350 % |
| e. | 2.2, 270 % | 3.3 >2365 % | >4.2 >2365 % | 14, 2290 % |

| | Polymer E. | Polymer F. | Polymer G. |
|---|---|---|---|
| a. | 64, 26, 10 | 67, 28, 5 | 67, 25, 8 |
| b. | 71.5 | 54.5 | 75.5 |
| c. | + 10 °C | + 12 °C | + 16 °C |
| d. | 47.5, 1110 % | 54, 980 % | 61, 730 % |
| e. | 13.7, 2365 % | 36, 1950 % | 76, 1210 % |

Mixtures were made of polymer A with each of the polymers B to G. The compound composition was according to the receptute of example 1 of the application.

| Polymer A. | Polymer B. | tensile strength in kg/cm² | elongation at break | tackvalue after 4 hours w 33 ill. |
|---|---|---|---|---|
| 0 | 100 | 3.3 | >2365 | >15400 |
| 10 | 90 | 3.1 | >2365 | >9000 |
| 20 | 80 | 2.9 | 2160 | >6400 |
| 30 | 70 | 2.9 | 1860 | 7000 |
| 40 | 60 | 2.8 | 960 | 3800 |
| 50 | 50 | 2.7 | 530 | 2200 |
| 60 | 40 | 2.6 | 280 | 1750 |
| Polymer A. | Polymer C. | | | |
| 0 | 100 | >4.2 | >2365 | 15000 |
| 10 | 90 | 3.4 | >2365 | 19000 |
| 20 | 80 | 3.0 | >2365 | >15800 |
| 30 | 70 | 2.8 | >2365 | 16000 |
| 40 | 60 | 2.8 | 1590 | 11200 |
| 50 | 50 | 3.0 | 660 | 3800 |
| 60 | 40 | 2.9 | 460 | 2200 |
| 70 | 30 | 2.8 | 290 | 1500 |
| Polymer A. | Polymer D. | | | |
| 0 | 100 | 14 | 2290 | — |
| 10 | 90 | >11.3 | >2365 | 4800 |
| 20 | 80 | >9.1 | >2365 | >7600 |
| 30 | 70 | 4.2 | >2365 | >10400 |
| 40 | 60 | 3.3 | >2365 | 11200 |
| 50 | 50 | 3.0 | 1530 | 6800 |
| 60 | 40 | 2.7 | 780 | 2600 |
| 70 | 30 | 2.7 | 320 | 1700 |
| Polymer A. | Polymer E. | | | |
| 0 | 100 | >13.7 | >2365 | 2200 |
| 10 | 90 | >10.7 | >2365 | 6000 |
| 20 | 80 | >4.3 | >2365 | >14600 |
| 30 | 70 | >3.9 | >2365 | >14400 |
| 40 | 60 | 3.1 | >2365 | >13600 |
| 50 | 50 | 2.9 | 1450 | 8400 |
| 60 | 40 | 2.9 | 1180 | 4200 |
| 70 | 30 | 2.8 | 410 | 2100 |
| 80 | 20 | 2.7 | 290 | 1400 |
| Polymer A. | Polymer F. | tensile strength in kg/cm² | elongation at break | tackvalue after 4 hours w 33 ill. |
| 0 | 100 | 36 | 1950 | — |
| 10 | 90 | 29 | 2150 | — |
| 20 | 80 | 17 | 2310 | 2000 |
| 30 | 70 | >7.3 | >2365 | 2100 |
| 40 | 60 | >4.3 | 2365 | >6200 |
| 50 | 50 | 3.0 | 2365 | >7800 |
| 60 | 40 | 2.7 | 2365 | >7400 |
| 70 | 30 | 2.6 | 550 | 3600 |
| 80 | 20 | 2.4 | 350 | 1800 |
| Polymer A. | Polymer G. | | | |
| 0 | 100 | 76 | 1210 | — |
| 10 | 90 | 67 | 1320 | — |
| 20 | 80 | 60 | 1400 | — |
| 30 | 70 | 43 | 1500 | — |
| 40 | 60 | 30 | 1580 | — |
| 50 | 50 | 21 | 1820 | 2100 |
| 60 | 40 | 11 | 1960 | >7200 |
| 70 | 30 | 3.7 | 2260 | >8400 |
| 80 | 20 | 3.0 | 540 | 1800 |
| 90 | 10 | 2.7 | 250 | 1350 |

EXAMPLE XXIII

Mixtures were prepared from polymer B with polyisoprene (Cariflex IR 305; cis 1.4 content: 92.0%, LVN 7.5 dl/g). These mixtures were compounded according to the receptute given in example 1 of the application. With the exception that the oil content varied with polyisoprene content.

| | Polyisoprene 25 parts oil | Mixture of 70 parts PIP 30 parts EPDM 32.5 parts oil | Mixture of 50 parts PIP 50 parts EPDM 37.5 parts oil |
|---|---|---|---|
| Polymer | | | |
| tensile strength | 1.5 kg/cm² | 3.3 kg/cm² | 14.5 kg/cm² |
| elongation | 750 % | 2365 % | 2365 % |
| Compound | | | |
| tensile strength | 0.9 kg/cm² | 1.1 kg/cm² | 1.6 kg/cm² |
| elongation | 110 % | 2030 % | 2070 % |
| Tack value g/5 mm after 6 hours illumination with w 33/amp | 750 | 1200 | 4600 |

EXAMPLE XXIV

Mixtures were made from polymer F and polyisoprene (Cariflex JR 305).

|  | 60 parts polyisoprene<br>40 parts EPDM<br>35 parts oil | 70 parts polyisoprene<br>30 parts EPDM<br>32.5 parts oil |
|---|---|---|
| Polymer |  |  |
| tensile strength | 12.5 kg/cm² | 4.5 |
| elongation | 1050 % | 990 |
| Compound |  |  |
| tensile strength | 6.1 kg/cm² | 1.4 kg/cm² |
| elongation | 1650 % | 1410 % |
| tack value after 6 hours illumination with w 33 lamp | 3100 g/5 mm | 1300 g/5 mm |

EXAMPLE XXV

Mixtures from polymer B with a high cis polyisoprene (Natsyn 2200 cis 1.4 content 96%) were made.

|  | polyisoprene<br>25 parts oil | 30 parts polyisoprene<br>70 parts EPDM<br>42.5 parts oil |
|---|---|---|
| Polymer |  |  |
| tensile strength | 1.6 kg/cm² | 23.5 kg/cm² |
| elongation | 200 % | 2340 % |
| Compound |  |  |
| tensile strength | 0.6 kg/cm² | 2.4 kg/cm² |
| elongation | 80 % | >2365 % |
| tack (after 4 hours illumination) | 600 g/5 mm | 8000 g/5 mm |

EXAMPLE XXVI

Mixtures of EPDM (polymer B) with SBR (SBR 1500) were made. The compounding was according to the recepture of example 1 of the application with the exception of the amount of oil.

| SBR 1500 | EPDM | Parts of oil per 100 parts of polymer mixture | Polymer Tensile strength kg/cm² | Elongation % | Compound Tensile strength kg/cm² | Elongation % | Tack |
|---|---|---|---|---|---|---|---|
| 100 | 0 | 25 | 19 | 390 | 1.2 | 260 | 650 |
| 50 | 50 | 37½ | >11 | >2365 | 2.4 | >2365 | 10800 |
| 40 | 60 | 40 | >22 | >2365 | 2.6 | >2365 | 12600 |
| 30 | 70 | 42½ | 31 | 2140 | 2.8 | >2365 | 13800 |
| 20 | 80 | 45 | 34 | 1940 | 2.9 | >2365 | 12000 |
| 10 | 90 | 47½ | 33 | 2200 | 2.9 | >2365 | 11000 |
| 0 | 100 | 50 | >32 | >2365 | 3.3 | >2365 | >15400 |

Optimum values are achieved with 30 parts SBR. When EPDM with higher green strength is mixed with SBR highest tack-values are reached at higher SBR contents.

EXAMPLE XXVII

A mixture of butylrubber (Butyl 218, Enjay) with EPDM-B was made. 80 parts EPDM-B with 20 parts butylrubber were mixed, together with compounding ingredients according to example 1 of the application except oil content that was 45 parts.

| Results: Polymer |  | Compound |  | after 4 hours illumination Tack value |
|---|---|---|---|---|
| tensile strength | elongation | tensile strength | elongation | g/5 mm |
| 22.5 kg/cm² | 2190 % | 2.9 kg/cm² | >2365 % | 9800 |

What is claimed is:

1. A process for preparing mixtures with building tack which are based on (1) a rubber-like copolymer of ethylene, at least one other α-alkene, and one or more polyenes, and (2) a tackifying resin, comprising exposing said mixture in the presence of oxygen and a compound effective as a photosensitizer under the conditions of the process to an artificial light source radiating light at a wave length of between 200 and 800 nanometers, and imparting a radiated energy to the mixture of at least 2 microwatts/cm² per nanometer;

wherein said mixture in the unvulcanized state and prior to said step of exposing, is characterized by an elongation at break of at least 500% and a tensile strength of between 1.5 and 50 kg/cm²; and wherein the copolymer of said mixture contains C═C bonds in the non-linear part of the polymer chain, wherein the carbon atoms of said C═C bonds either (a) have two hydrocarbon groups which are in a vicinal cis relative position to each other and which do not form part of the same system, or (b) have at least three hydrocarbon groups attached thereto; and wherein said copolymer contains 50 to 85 mole % ethylene and 0.1 to 20% by weight of said polyene; whereby said mixture is characterized by building tack after said step of exposing.

2. The process according to claim 1, wherein as a result of said step of exposing, said mixture is exposed to a total radiated energy of UV light of a wavelength of between 200 and 400 nm which is at most half the total radiated energy of light in the wavelength range of from 200 to 600 nm.

3. The process according to claim 1, wherein, as a result of said step of exposing, said mixture is exposed to a total radiated energy of UV light of a wavelength of 200 to 400 nm which is at most one fourth of the total radiated energy of light in the wavelength ranging from 200 to 600 nm.

4. The process according to claim 1, wherein, as a result of said step of exposing, said mixture receives a total radiated energy of UV light of 325 to 400 nm, which is at most one fourth of the total radiated energy of light of wavelength ranging from 325 to 600 nm.

5. The process according to claim 1, wherein, as a result of said step of exposing, said mixture is exposed to a total radiated energy of UV light of a wavelength of 325 to 400 nm, which is at most one sixth of the total radiated energy of light of the wavelength ranging from 325 to 600 nm.

6. The process according to claim 1, wherein said light is visible light.

7. The process according to claim 1, wherein the radiated energy exceeds 30 μW/cm² per nm.

8. The process according to claim 7, wherein said radiated energy exceeds 200 $\mu W/cm^2$ per nm.

9. The process according to claim 1, wherein said mixture is exposed to a total radiated energy which is less than 15 Joules/$cm^2$ per nm.

10. The process according to claim 1, wherein the tensile strength of said mixture ranges between 2 and 30 kg/$cm^2$.

11. The process according to claim 1, wherein said tensile strength ranges between 3 and 25 kg/$cm^2$.

12. The process according to claim 1, wherein said tensile strength of said mixture is less than 15 kg/$cm^2$.

13. The process according to claim 1, wherein said elongation at break of said mixture exceeds 800%.

14. The process according to claim 13, wherein said elongation at break of said mixture exceeds 1700%.

15. The process according to claim 1 wherein said copolymer contains 55 to 80 mole % ethylene.

16. The process according to claim 15, wherein said ethylene content is between 60 and 77.5 mole %.

17. The process according to claim 16, wherein said copolymer shows a peak at a temperature of between $-7°$ and $11°$ C., in a thermogram recorded by means of differential scanning calorimetry at a cooling rate of $8°$ C. per minute, in which the heat of crystallization is plotted as a function of the temperature.

18. The process according to claim 17, wherein the peak occurs between $-3°$ and $+8°$ C.

19. The process according to claim 17, wherein the peak occurs between $0°$ and $+6°$ C.

20. The process according to claim 17, characterized in that the copolymer is prepared with the aid of the catalyst-combination vanadiumoxytrichloride and alkylaluminiumsesquichloride.

21. The process according to claim 1, wherein said tackifying resin is prepared from an alkyl phenol and formaldehyde, said resin having a molecular weight of between 200 and 3000, said alkyl group having 1 to 30 carbon atoms.

22. The process according to claim 1, wherein said tackifying resin is prepared from alkyl phenol and formaldehyde, said tackifying resin having a molecular weight of between 200 and 3000 and said alkyl group having 8 to 12 carbon atoms.

23. The process according to claim 1, wherein the amount of photosensitizer ranges between 0.001 to 1% by weight based on said copolymer.

24. The process according to claim 23, wherein said quantity of photosensitizer ranges between 0.01 to 0.5% by weight.

25. The process according to claim 1, wherein said sensitizer comprises one or more polynuclear aromatic compounds of 3 to 50 aromatic nuclei.

26. The process according to claim 1, wherein said photosensitizer is an aromatic oil, the aromatic content of which exceeds 40% by weight, said aromatic oil having a transmission of less than 95% if 74 mg of said oil are dissolved in 100 ml of n-hexane.

27. The process according to claim 1, wherein said mixture comprises (i) and (ii) wherein
  (i) is a copolymer of ethylene, at least one other $\alpha$-alkene and one or more polyenes, said copolymer having a tensile strength of at least 10 kg/$cm^2$ and an ethylene content lying between 50 and 80 weight %, and
  (ii) is a copolymer of ethylene, at least one other $\alpha$-alkene and one or more polyenes with a tensile strength lower than 10 kg/$cm^2$ and an ethylene content lower than 65 weight %.

28. The process according to claim 27, wherein the ethylene content of the copolymer of (i) lies between 62 and 75 weight % and wherein the ethylene content of (ii) lies between 50 and 63 weight %.

29. The process according to claim 27, wherein each of (i) and (ii) has a Mooney viscosity ML(1 + 4)125° of at least 20.

30. The process according to claim 28, wherein each of (i) and (ii) has a Mooney viscosity ML(1 + 4)125° of at least 30.

31. A mixture prepared by the process of claim 1.

32. The process of claim 1, wherein said polyene is ethylidenenorbornene.

33. The process of claim 15, wherein said polyene is ethylidenenorbornene.

* * * * *

UNITED STATES PATENT AND TRADEMARK OFFICE
CERTIFICATE OF CORRECTION

PATENT NO. : 4,127,461
DATED : November 28, 1978
INVENTOR(S) : Hendrikus J.G. Paulen It is certified that error appears in the above-identified patent and that said Letters Patent are hereby corrected as shown below:

Line 17 of the Abstract of the Disclosure is corrected to read as follows:

"200 and [300] 800 nm"

Signed and Sealed this

Eighth Day of May 1979

[SEAL]

Attest:

RUTH C. MASON
Attesting Officer

DONALD W. BANNER
Commissioner of Patents and Trademarks